UNITED STATES PATENT OFFICE.

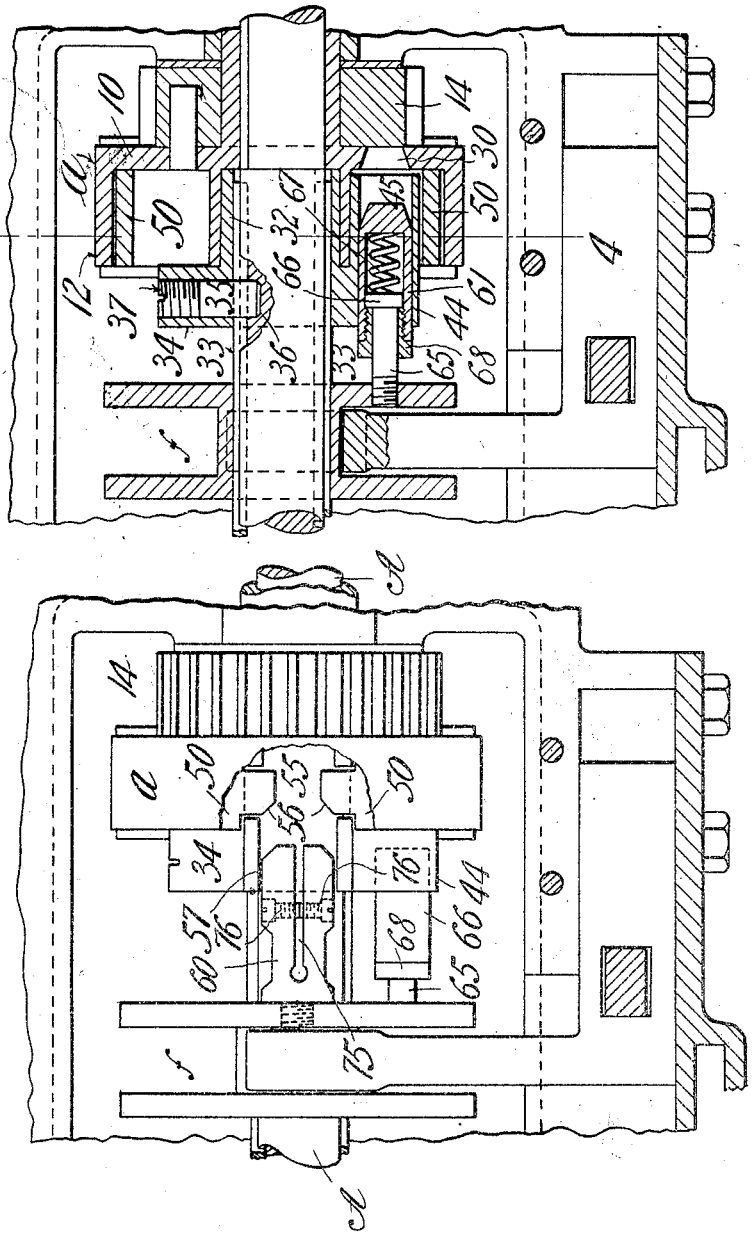

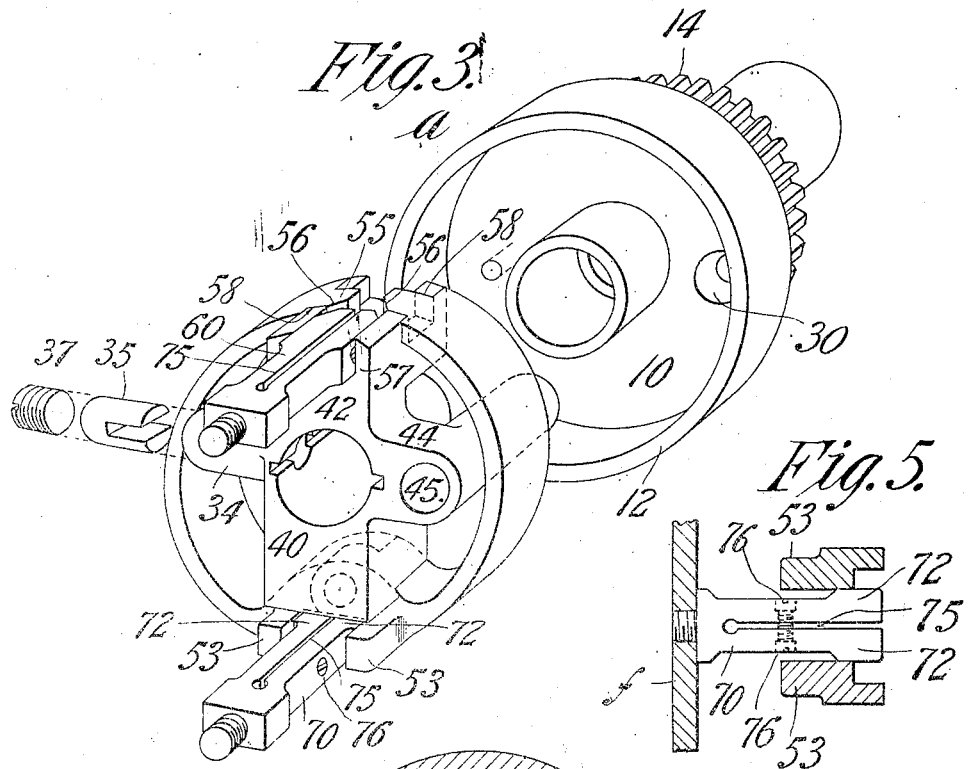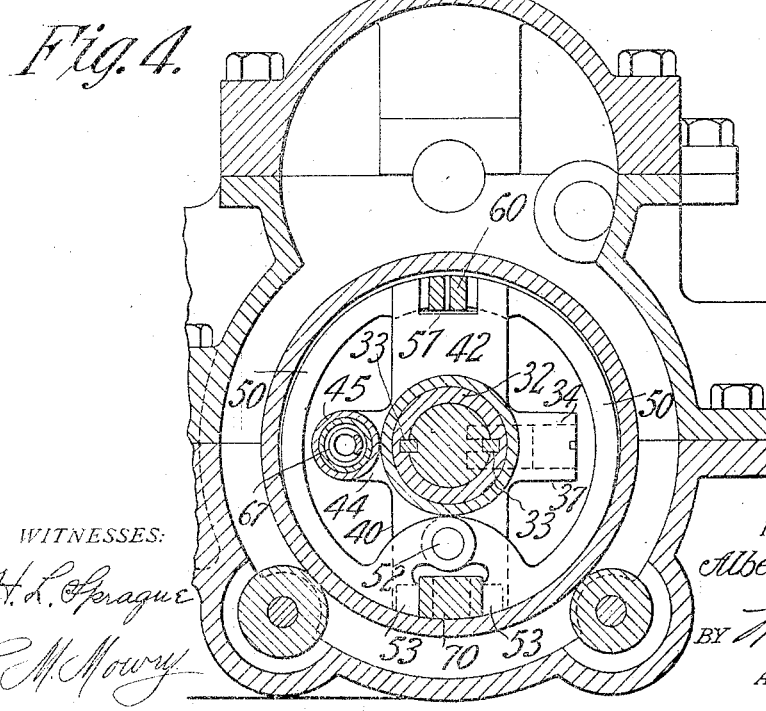

ALBERT LATHAM, OF BEVERLY, MASSACHUSETTS, ASSIGNOR OF ONE-HALF TO JAMES W. NOURBOURNE, OF SOMERVILLE, MASSACHUSETTS.

COMBINED FRICTIONAL AND POSITIVELY LOCKING CLUTCH.

957,851.  Specification of Letters Patent.  Patented May 10, 1910.

Application filed September 2, 1908. Serial No. 451,356.

*To all whom it may concern:*

Be it known that I, ALBERT LATHAM, a citizen of the United States of America, and resident of Beverly, in the county of Suffolk and State of Massachusetts, have invented certain new and useful Improvements in Combined Frictional and Positively Locking Clutches, of which the following is a full, clear, and exact description.

The object of this invention is particularly to provide a clutch which, at pleasure, may be operative as a friction clutch, or both as a friction and a positively locked clutch for the acquirement of the advantage of "flexibility" in operation, that is that the clutching elements may, initially, be engaged through the medium of friction shoes when the power or transmission shaft is first connected with the element to be driven,—the driving and driven elements thereafter having the capability of being, by the clutch, positively mechanically interlocked as may be more desirable after the driven part has fully partaken of the rotative movement of the driving part. Such a clutch is of especial availability in a speed and power transmission device for automobiles as tending to obviate all violence, jolting, gear teeth grinding or other destructive action heretofore commonly experienced in the generally employed sliding gear transmission mechanism. The clutch is, however, equally useful and advantageous in other situations.

The invention consists in the combination and arrangement of parts and the constructions of certain of the parts all substantially as hereinafter fully described and set forth in the claims.

In the drawings:—Figure 1 is a plan view of the clutch. Fig. 2 is a horizontal section of the same on the plane of its axis. Fig. 3 is a perspective view showing the parts of the clutch in separated relations. Fig. 4 is a vertical cross sectional view on line 4—4, Fig. 2. Fig. 5 is a partial section and plan view showing a particular relative position of the friction shoe contracting bar hereinafter noted.

Similar characters of reference indicate corresponding parts in all of the views.

In the drawings,—A represents a shaft about which the clutch has an encircling engagement, one member of the clutch being affixed to, and non-rotative relatively to the shaft, while the other clutch member is loose, normally, relatively to the shaft, but susceptible of compulsory rotation with the shaft when engaged or interlocked with the relatively non-rotative member.

The normally loose clutch member $a$ is made of a cup-shape that is, it has the form of a disk 10 with a right-angularly extended annular flange 12. The cup-shaped clutch member has a gear wheel 14 formed as part of or affixed to its back 10, and it is provided in its back with a socket 30 parallel with its axis.

Adjacent the circular clutch member is a support for the coacting or fellow clutch devices, the same comprising a hub 32 fitting over the shaft which is made with the longitudinally continuous spline ribs 33 which are especially provided for the sliding but non-rotatable engagement of the clutch operating collar $f$ in relation to the transmission shaft. Each of said hubs has a socketed boss 34 receiving therein a plug 35 endwise recessed to straddle the spline rib 33 of shaft A and entering a socket 36 made transversely within the side of the shaft; and said interlocking plug 35 is confined in place by the screw plug 37 threading into the socketed boss 34. The hub 32 of the aforesaid support has radially extending members 40 and 42 in line with each other and the radially extended member 44 at right angles to the line of the members 40 and 42, the portion 44 being elongated in a line parallel with the axis of shaft A and made with a circular bore 45 extending from end to end therethrough.

On the member 40 of the clutch device support a pair of approximately semi-circular friction shoes 50, 50, are connected by a common pivot 52, said shoes having lugs 53 adjacent their connecting pivot, therebelow and in a suitable degree of separation. The position of the friction shoes and cross shaped supporting structure therefor is within the space inclosed by the flange rim 12 of the proximate circular clutch member $a$ so that when the friction shoes are expanded they will bind against the inner surface of the rim 12; and the free ends of the friction shoes are reduced in width, as represented at 55 and are made with beveled corners, as represented at 56. The other end of the portion 42 of the support has a recess 57 thereacross in a line parallel with the shaft, the same being intersected at right angles by another recess 58 in which fit the narrowed extremities 55 of the friction shoes. Said recess 57 forms a slideway for the friction shoe expanding bar 60 soon to be more particularly described. In the bore 45 of the aforesaid supporting structure is a longitudinally slidable locking bolt 61 which is made with a solid inner end and otherwise tubular, opening to its outer end and formed with an internal screw thread (see Fig. 2).

The clutch device has for action adjacent thereto and in conjunction therewith the collar *f* deeply annularly grooved, and while free for endwise play along the shaft which it surrounds, it can have no rotary movement independently of such shaft because of its engagement with the aforesaid spline rib 33. Said collar carries a longitudinally extending stud 65 having a head enlargement 66 engaged within the tubular bolt 61 and in contact against a spiral spring 67 within the latter and in endwise bearing against the solid inner end of the bolt. An annular plug 68, screw engaging into the threaded orifice of the tubular bolt, forms an abutment for the bolt head 66 and yet allows the stud to play endwise inwardly independently relatively to the bolt. The bolt and alined stud are as far radially offset from the axis of the transmission shaft as is the aforementioned socket 30 in the back of the circular clutch member, as definitely shown in Fig. 2, and in a manner indicated in Fig. 3. The aforesaid collar *f* carries, as a rigid longitudinal extension thereof parallel with the transmission shaft and alined with the aforementioned recess 57 in the end of the member 42 of the support, the shoe expanding bar 60, the end of which is beveled or made of wedge shape and the end portion of which plays in the aforementioned recess 57; and when the collar is moved in a proper degree toward the back of the circular clutch member, the free end portion of the bar 60 will enter between and expand the friction shoes setting them in their bind against the inner surface of the flange of clutch member *a*.

Diametrically opposite but ranging parallel with the friction shoe expanding bar 60 is a friction shoe contracting bar 70, the same having an engagement in suitable time and during the endwise movement of the collar which carries it with the aforementioned lugs 53, with the result of applying through such lug a leverage to swing the friction shoes inwardly and free from bind against the clutch member rim.

It is noted that the points of engagement between the widened end portions 72 of the bar 70 and the points of engagement between the widened end portion of the bar 60 and the free ends of the friction shoes are in different transverse planes or locations so that when the collar is forced to move the bars toward one of the circular clutch members sufficiently far to bring the shoe expander into engagement between the ends of the shoes, a shoe contracting bar 70 will have passed inwardly beyond and out of engagement with the aforesaid lugs 53, and vice versa; and in Figs. 3 and 5, the relations of the parts are understood to be those when the collar *f* is moved endwise away from the clutch member, freeing the shoes so that they may be contracted, the portions 72 of the contracting bar 70 being shown in the engagement with the lever lugs 53 to positively inwardly swing the shoes.

The bars 60 and 70 are made with their extremities of maximum width and narrowed to the rear of such wide portions and the bars are longitudinally split or slotted, as represented at 75 and capable of adjustment, as may be accomplished by the abutting inner ends of screws 76 which oppositely penetrate the portions of the bar at either side of the slot. By reason of the capability of adjustment of the bars 60 and 70 as to their widths, compensation is provided for wear between the engaging extremities of the bars and the parts of the friction shoes with which they coact.

The construction for interengaging relations of the friction shoe extremities and the expanding bar 60 with the support member 42, the extremity of which is recessed on intersecting lines at right angles to each other provides for a maintaining of the parts always in their proper relations for a nicety of operation.

The bar 70 in its arrangement for coaction with the lugs 53, 53, of the friction shoes below the pivotal mounting of the latter not only provides for a positive contraction of the friction shoes when they are disengaged by the expanding bar, but it insures that the shoes will remain in their contracted relations, and with no possibility of their being centrifugally moved while the device is in its normal and unclutched condition.

I claim:—

1. In a clutch a shaft, a cup shaped clutch member on, and normally rotatively free relatively to the shaft and having a socket in its back, a support affixed on the shaft carrying one or more friction shoes which have their locations within the rim flange of said clutch member, said support having a socket parallel with the shaft and a slidable locking bolt in said socket for coaction with the socket portion of the cup-shaped clutch member, a collar slidable along the shaft having a longitudinally extending member for setting the friction shoes into, and for releasing them from, bind with the rim of the cup shaped member and a stud carried by and longitudinally projecting from said collar and coacting with the slidable bolt.

2. In a clutch, a shaft, a cup-shaped member normally rotatively free thereon and having a socket in its back, a support affixed on the shaft provided with one or more friction shoes within and coacting with the rim of said cup-shaped member, said support having a socket parallel with the shaft, a slidable locking bolt in said socket for coaction with the socket portion of the cup-shaped clutch member, a collar slidable along the shaft, having longitudinally extending bars for respectively setting and withdrawing the friction shoes into and out of bind with the clutch member rim, a stud carried by and longitudinally extended from said collar, alined and telescopically engaged with said bolt, and a spring for reaction endwise between the stud and bolt.

3. In a clutch a shaft, a cup-shaped clutch member normally rotatively free thereon, a support affixed on the shaft adjacent said clutch member, comprising a part radially extended having a transverse recess in its outer end and an intersecting recess at such end parallel with the shaft, one or more friction shoes movably carried by said support, the approached ends of which are located within said transverse recess, and a collar slidable along the shaft having a longitudinally extending shoe expanding bar, the extremity of which plays in said intersecting recess of the support and coacts with the approached extremities of the shoes.

Signed by me at Boston, Mass., in presence of two subscribing witnesses.

ALBERT LATHAM.

Witnesses:
J. W. NOURBOURN,
M. C. NOURBOURN.